United States Patent

Woods

[15] 3,660,209
[45] May 2, 1972

[54] LAMINATION PRESS EMPLOYING ECCENTRICALLY ACTUATED ROCK SHAFTS FOR MOVING ITS PLATEN

[72] Inventor: Billy L. Woods, 3818 West Ocotillo, Phoenix, Ariz. 85019

[22] Filed: Aug. 4, 1969

[21] Appl. No.: 847,245

[52] U.S. Cl. .............................................. 156/580, 100/281
[51] Int. Cl. ..................................... B30b 7/04, B32b 31/20
[58] Field of Search .................................. 156/580; 100/281

[56] References Cited

UNITED STATES PATENTS

| | | |
|---|---|---|
| 2,217,199 | 10/1940 | Emmey .............................. 156/580 X |
| 2,535,642 | 12/1950 | Liebowitz ........................... 156/580 X |
| 2,774,700 | 12/1956 | Killington .......................... 156/580 X |
| 3,139,369 | 6/1964 | Sullivan et al. .................... 156/580 UX |
| 3,511,175 | 5/1970 | Rugel ................................. 156/580 X |

Primary Examiner—Benjamin A. Borchelt
Assistant Examiner—J. J. Devitt
Attorney—Willard L. Groene

[57] ABSTRACT

A laminating press for accurately forming laminated panels for building construction comprising a thick foam plastic sandwiched between masonite side panels covered with fiberglass on their outside surfaces, the press being operable to load the materials, accurately position and support the side panels and fiberglass sheets in precise position during the forming operations.

1 Claim, 9 Drawing Figures

INVENTOR
BILLY L. WOODS
BY
Willard S. [signature]
ATTORNEY

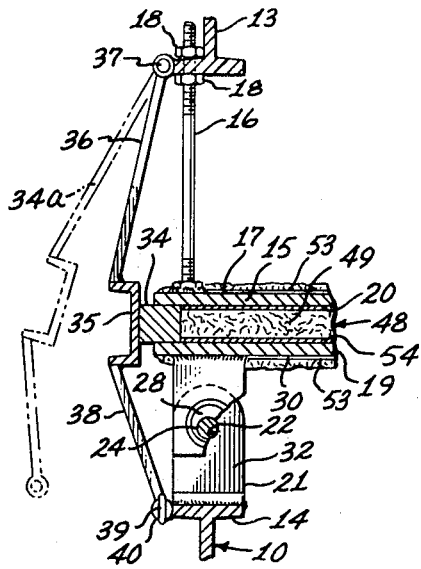
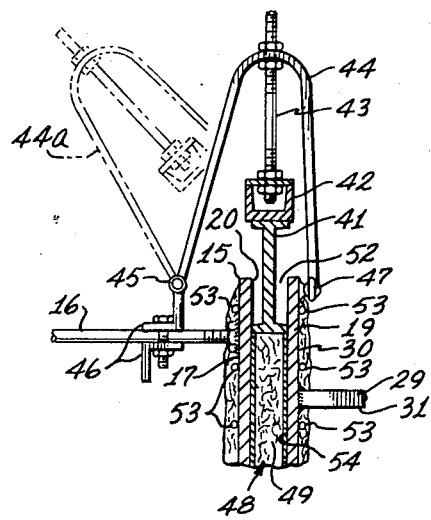
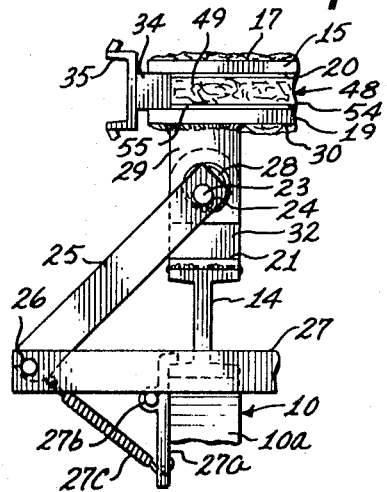
Fig-3
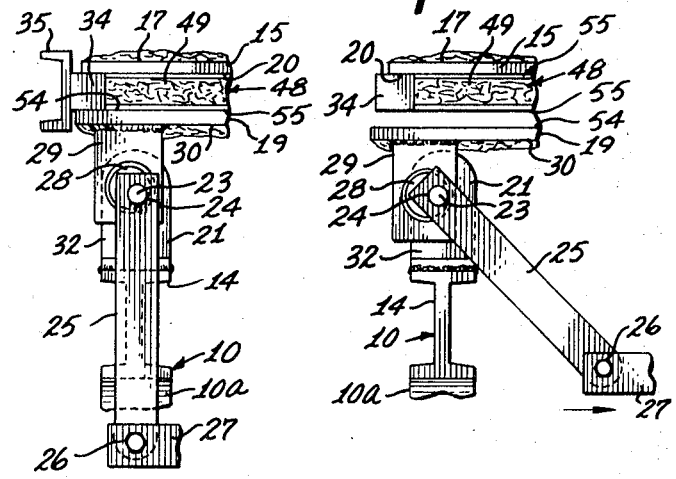
Fig-4
Fig-5
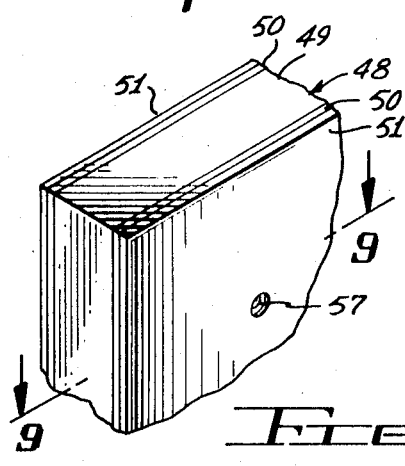
Fig-8
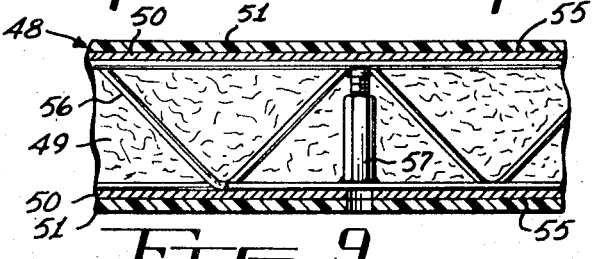
Fig-6 Fig-7
Fig-9
INVENTOR.
BILLY L. WOODS

3,660,209

LAMINATION PRESS EMPLOYING ECCENTRICALLY ACTUATED ROCK SHAFTS FOR MOVING ITS PLATEN

BACKGROUND OF THE INVENTION

Heretofore, it has been difficult to form composite construction panels in an accurate and production like proceedure because of the disimilar nature of the elements and materials going into the make up of the laminated panels. Further, it has been difficult in the past to provide high dimensional accuracy and reinforcing within such panels and suitable means by which they could be handled and erected without damage to the finished exterior of the laminated units. And it has been a problem to provide a panel with the above qualities which at the same time had high insulative characteristics and good finish and appearance and durability on its outer exposed surfaces.

SUMMARY OF THE INVENTION

One of the objects of this invention is to provide a laminating process for forming insulative laminated building construction panels in a rapid and accurate manner.

Another object is to provide a press capable of forming a construction panel and the like in which a core of foam plastic material is sandwiched between hard sheets of masonite which in turn is coated on their outer side with fiberglass.

A further object is to provide such panels with reinforcing trusses at the time the panels are formed in the press.

BRIEF DESCRIPTION OF THE DRAWINGS

FIG. 3 is an enlarged fragmentary sectional view on the line 3—3 of FIG. 2.

FIG. 4 is an enlarged fragmentary sectional view on the line 4—4 of FIG. 1.

FIG. 5 is an enlarged fragmentary sectional view on the line 5—5 of FIG. 1 showing the press platen in clamped up position.

FIG. 6 is a view similar to FIG. 5, but showing the press platen in seal breaking position with the finished panel.

FIG. 7 is a view similar to FIG. 5, but showing the press platen withdrawn from the panel.

FIG. 8 is an enlarged fragmentary perspective view of a portion of the completed panel.

FIG. 9 is an enlarged sectional view on the line 9—9 of FIG. 8.

DESCRIPTION OF THE PREFERRED EMBODIMENT

Figure 1:
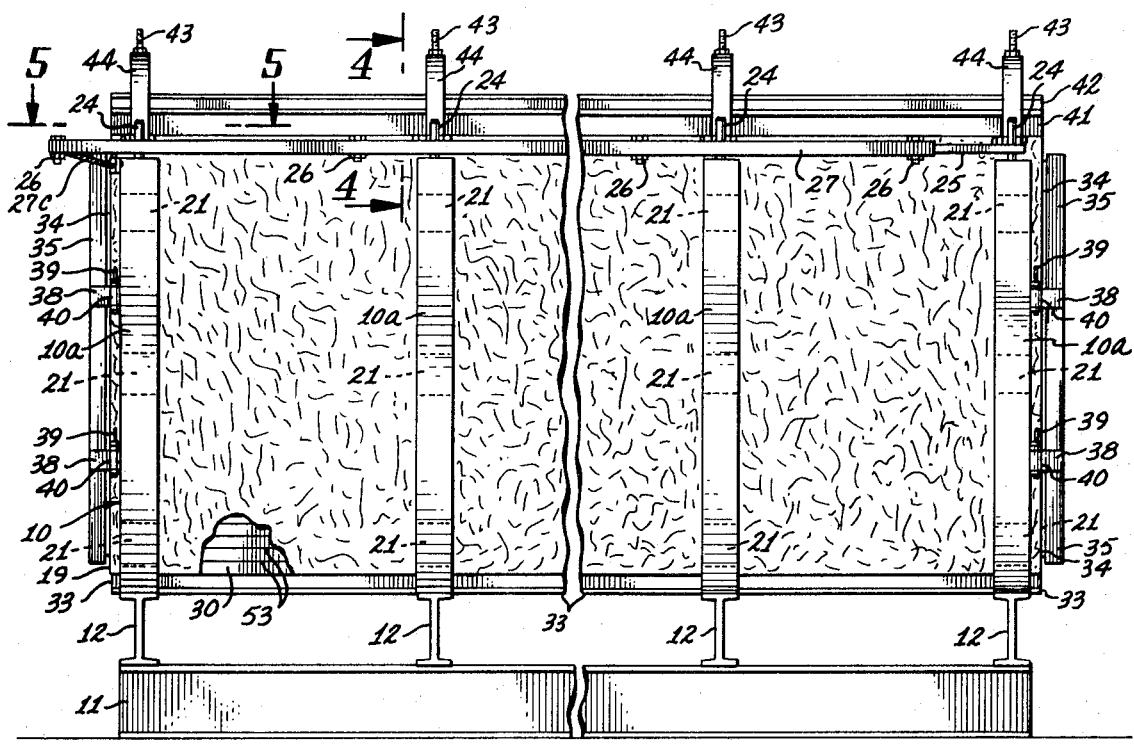
FIG. 1 is a elevation of a laminating press incorporating the features of this invention.

As an example of one embodiment of this invention, there is shown a lamination press having a frame 10, comprising the longitudinally extending floor engaging rails 11 to which are fixed the transverse bed rails 12, the vertically disposed side columns 13 and 14, and the support braces 10a secured to the bed rails 12. The fixed bolster plate 15 is adjustably fixed to the columns 13 by suitable threaded studs 16 fixed to the rear surface 17 of the bolster plate 15 and adjustably secured by the nuts 18 to the columns 13.

The press platen 19 is mounted on the frame 10 for horizontal movement both to and from the face 20 of the bolster and parallel to the face 20 of the bolster 15. To this end a series of brackets 21 are fixed to the columns 14 having bores 22 defining an axis 23 of the eccentric rock shafts 24 to which are fixed actuating levers 25, the outer ends of which are suitably povitally connected by bolts 26 to a shuttle bar 27 which may be actuated longitudinally manually or by power, if desired. A shuttle bar 27 locking mechanism is provided as shown in FIG. 5, and comprises a latch 27a pivotally mounted by pin 27b to the shuttle bar 27, a tension spring 27c has one of its ends mounted on the shuttle bar 27, and the other end secured to latch 27a. The locking mechanism is utilized to prevent movement of the shuttle bar by reverse pressures caused by curing of the construction panel being formed in the press.

Fixed to the rock shafts are a series of eccentrics 28 around which are journaled the series of brackets 29 fixed to the outside face 30 of the platen. The underside 31 of the brackets 29 are supported against downward movement on the upper faces 32 of the brackets 21 so as to support the platen in operative position with the bolster plate 15.

A bottom filler block 33 is supported on the top of the transverse bed rails 12 while end filler blocks 34 are held in position by channel members 35 mounted on the hinges 36 and hinge pins 37 on the columns 13. Locking arms 38 are fixed to the channel members 35 and have locking pull pins 39 engaging suitable pin sockets 40 fixed to the columns 14 to demountably secure the end filler blocks in operative position.

A top filler member 41 is held in operative position by a bar member 42 having threaded adjustable studs 43 mounted in the inverted U-shaped straps 44 which are hinged at 45 to clamp brackets 46 clamped to the appropriate stud 16 and locked in operative position by a locking pin 47 engaging a locking socket fixed to the edge of the platen 19.

The lamination construction panel 48, FIGS. 8 and 9, comprises a central core 49 of heat expanded polystyrene foam or other equivalent materials, faced with appropriate hard sheets of this Masonite hard board 50. Fiberglass coatings 51 may be applied to the outside surfaces of the hard board as desired to complete the lamination construction panel 48.

Figure 2:
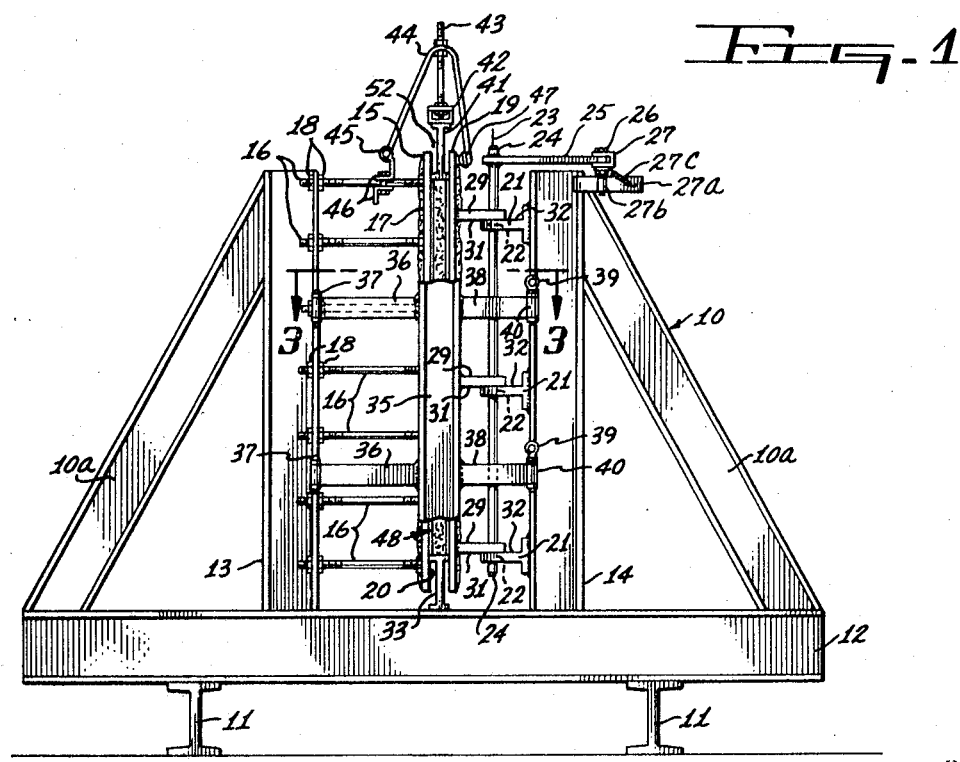
FIG. 2 is an end elevation of the laminating press shown in FIG. 1.

With bottom filler block 33 and the end filler blocks 34 in place against the edges of the hard board panels 50 and with the platen 19 moved to operating position, FIGS. 2 and 5, the foam forming material is placed in the top opening 52, FIG. 4, provided by swinging the straps 44 to position 44a. The straps and top filler member is then swung to position 44 and heating elements 53 on the outside faces of the bolster 19 are energized. This causes the foam forming materials to expand and fill the space between the hard boards 50 and the filler blocks 33, 34, and 41, to produce an accurately dimensioned lamination construction panel.

After the foam core has sufficiently set up, the shuttle bar is moved part way to the right, FIG. 6, to cause the eccentrics 28 to shift the platen 19 to the left sufficiently to break the seal of the inner face 54 of the platen 19 from the outer face 55 of the board. This initial seal breaking sliding action is especially important when fiberglass sheets 51 are placed in the press between the outer faces 55 of the hard boards 50 and the work contacting faces 20 and 54 of the bolster 15 and platen 19.

If required, structural truss members 56 may be inserted between the hard boards 50 in the press and thus incorporated within the panel 48 having the threaded bores 57 to facilitate picking up and erecting the panels in a building structure of great strength and durability.

The shuttle bar 27 is then moved all the way to the right, FIG. 7, to fully release the platen 19 from the work. The various filler blocks 34 and 41 are released and swung back out to position 34a and 44a so that the workpiece laminate panel 48 may be removed from the machine.

I claim:

1. A lamination press comprising in combination:
  A. a frame,
  B. a bolster plate fixed to the frame,
  C. a platen movably mounted on the frame,
  D. and an actuating device on the frame operable for moving the platen during a pressing operation parallel to the bolster plate and then sequentially transcending into platen motion at right angles thereto and in a press unloading operation moving the platen at right angles to the bolster plate and then parallel thereto,
  E. said actuating device including a plurality of eccentrically actuated rock shafts for initially moving the platen, and
  F. latch means actuated by movement of the actuating device during a pressing operation for locking the actuating device to said frame at a predetermined position of said platen to prevent reverse pressure on said platen from moving it against the operation of said rock shafts.

* * * * *